Sept. 19, 1944.   G. A. TINNERMAN   2,358,607
FASTENING DEVICE
Filed Oct. 28, 1943

INVENTOR.
George A. Tinnerman,
BY
Bates, Teare & McBean,
Attorneys.

Patented Sept. 19, 1944

2,358,607

UNITED STATES PATENT OFFICE 2,358,607

FASTENING DEVICE

George A. Tinnerman, Cleveland, Ohio, assignor to Tinnerman Products, Inc., Cleveland, Ohio, a corporation of Ohio Application October 28, 1943, Serial No. 508,005

10 Claims. (Cl. 292—87)

This invention relates to a fastening device comprising two coacting parts adapted to be secured respectively to two members which are to be latched together in a position at an angle to each other. The fastening device is adapted, for instance, for latching a lid to the wall of a receptacle.

In recent years the use of plywood, fibre, etc. has resulted in the formation of boxes and receptacles having comparatively thin walls which have presented difficulties in attaching suitable latching devices. My fastener is especially well adapted for mounting on such thin-wall receptacles but may also be mounted on walls of greater thickness.

More particularly, my fastener comprises a latching element of resilient spring material adapted to be attached to one of the members of the receptacle and a keeper element for attachment to the other member of the receptacle. The latching element has a sliding spring engagement with the keeper element as the receptacle is closed and upon complete closure automatically engages a shoulder of the keeper element as hereinafter more fully explained.

An object of the invention is to provide the two elements of the latching device in forms which when mounted may snap by spring action into closed position, and will effectively retain such engagement in use, but may be easily released by manual action on the latching member of the fastener.

Another object of the invention is to provide the two elements of my fastener in a form which may be very cheaply constructed of sheet material and may be readily applied to a receptacle and when applied hold itself firmly in position, even though the walls of the receptacle be quite thin.

My invention is hereinafter more fully explained and its essential novel characteristics set out in the claims.

Figure 1:
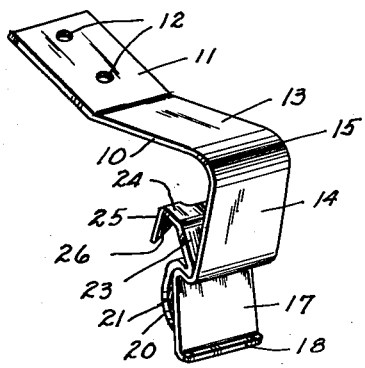
Figure 2:
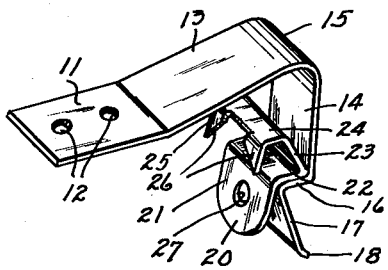
Figure 3:
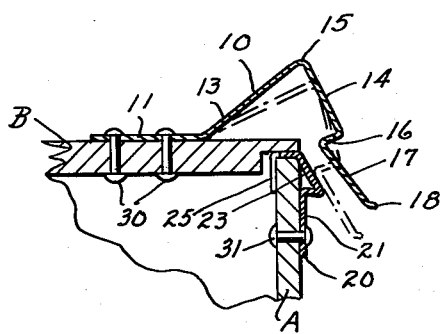
Figure 4:
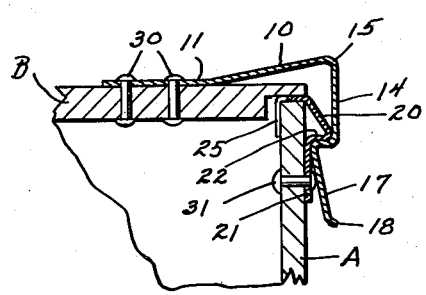
Figure 5:
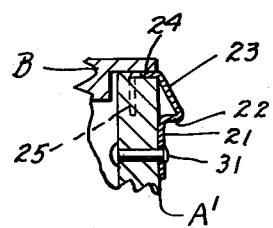

In the drawing, Fig. 1 is a perspective of the two members of my fastening device in locked position, looking at the outer face thereof; Fig. 2 is a perspective of the same parts looking at the inner face thereof; Fig. 3 is a cross section of a corner portion of a receptacle equipped with my fastening device and showing the parts of the fastening device in unlatched position; Fig. 4 is a similar view showing the parts in latched position; Fig. 5 is a fragmentary cross section showing the keeper member of the fastener applied to a panel of greater thickness than that of Figs. 3 and 4.

In Figs. 3 and 4, A indicates the vertical wall of a receptacle and B a lid which it is desired to latch to the wall. 10 indicates the latching member of the fastener which is secured to the lid, and 20 the keeper member secured to the wall.

In describing the two parts of the fastener in detail, it is convenient to use the directions of the respective portions as they appear in the drawing, though obviously such parts might extend in other directions with a different mounting.

As shown in the drawing, the latch 10 has a flat attaching portion 11 shown as provided with two holes 12 for the passage of fastening rivets. A flat region 13 extends in an upwardly inclined direction from the region 11. Then comes a downwardly extending region 14 at approximately right angles to the region 13 and connected therewith by a short curve 15. At the lower end of the region 14 is an abrupt inwardly extending portion 16, from the inner edge of which depends a lip 17 inclined outwardly. The extreme end of this lip is preferably slightly flanged outwardly as at 18.

The keeper 20 of the fastener comprises a flat attaching portion 21, an abrupt outward extension 22 from the top of the attaching portion inclining slightly downwardly, an inwardly and upwardly inclined portion 23 from the outer edge of the shoulder 22, a flat top portion 24 at substantially right angles to the plane of the portion 21, and, finally, a downwardly extending edge portion 25 at substantially right angles to the portion 24. The portion 21 is shown as having an opening 27 for the passage of a securing rivet.

As shown in Figs. 3 and 4, the latching member 10 is secured to the lid B of the receptacle by two rivets 30 passing through the lid and occupying the holes 12 in the latching member. The arm 13 of the latching element extends from the anchorage portion 11 in a direction upwardly inclined from the top of the lid into a position beyond the end of the lid so that the downward portion 14 of the latching element may extend across the keeper, and incline outwardly when not engaging the keeper. The keeper 20 is shown as mounted against the outer face of the receptacle wall A with the downward extension 25 engaging that wall back or the inner face. This engagement of the portion 24 of the fastener with the top of the wall and the downward portion 25 with a portion of the wall enables a single rivet 31 passing through the wall and occupying the opening 27 of the keeper to hold the keeper in definite position.

As will be seen in the thin walled construction of Figs. 3 and 4, the downward member 25 of the keeper lies against the inner face of the front panel A of the receptacle and thus provides for effectively holding the keeper on a thin panel. In Fig. 5, I have shown at A' a thicker front panel and in this case the same keeper may be used with the downward portion 25 forced into the material of the panel instead of engaging the inner face thereof. In either case this downward extension engages the outer face and the top portion of the keeper engages the top of the wall.

The downwardly extending portion 25, made by bending the material downwardly, is preferably formed into two spaced prongs. Each of these prongs is brought to a point preferably by beveling the inner edge thereof as shown at 26. When the keeper is mounted on the thin panel, as illustrated in Figs. 3 and 4, these prongs merely engage the inner face of the panel. If the panel is thicker the prongs readily extend into the material thereof, being forced downwardly from the top edge of the panel, as illustrated in Fig. 5.

The latch 10 is so formed of resilient sheet material that the downward portion 14, which normally extends at an angle of preferably slightly less than 90° to the top portion 13, stands when the parts are unlatched substantially in the position shown in full lines in Fig. 3, where this downward portion overhangs at a considerable angle the keeper 20. To latch the device it is merely necessary to press downwardly in the region of the junction of the portions 14 and 13. This causes the latch to swing downwardly about the junction of the portions 13 and 11 as a hinge, so that the portion 14 engages the incline 23 of the keeper and slides downwardly along the same until the shoulder 16 passes beyond such incline, whereupon it springs beneath the shoulder 22 of the keeper. As stated this shoulder is preferably slightly inclined upwardly toward the attaching part and thus a very tight engagement is maintained.

In unlatching the fastener, it is merely necessary to pry outwardly the downwardly extending lip 17 as, for instance, by inserting any suitable tool or one's finger under such portion and pulling outwardly. This causes the latch shoulder 16 to clear the keeper shoulder. When the lid is raised the lip 17 may slide up along the incline 23 of the keeper, or spring into its normal position considerably beyond the keeper.

My fastener is adapted to form a single latching means for a hinged cover, or, if desired, a plurality of such fasteners may be efficiently employed to retain a cover which merely rests on the receptacle.

I claim:

1. A two-part fastener, adapted to latch together two members at an angle to each other and comprising a spring latch and a keeper characterized by said spring latch having a relatively inwardly extending shoulder, said keeper being made of a single piece of sheet material and having in succession an attaching portion, a relatively outwardly extending shoulder, a relatively upwardly extending portion, a relatively inwardly extending top portion, and a relatively downwardly extending retaining portion.

2. A two-part fastener, adapted to latch together two members at an angle to each other and comprising a spring latch and a keeper, wherein said latch has a relatively inwardly extending shoulder, and a relatively downwardly extending lip and said keeper is made of a single piece of sheet material and has in succession an attaching portion, a relatively outwardly extending shoulder, a relatively upwardly inclined guiding portion, and a relatively inwardly extending top portion.

3. A two-part fastener, adapted to latch together two members at an angle to each other and comprising a spring latch having a relatively inwardly extending shoulder, and a keeper made of a single piece of sheet material and having an attaching portion, a relatively outwardly extending shoulder, a relatively inwardly extending top portion, and two spaced prongs extending relatively downwardly from the inner edge of the top portion.

4. A two-part fastener, adapted to latch together two members at an angle to each other and comprising a spring latch and a keeper, said spring latch having an attaching portion adapted to be secured to one of said members, a relatively downward portion adapted to extend across the other member and carrying an inwardly extending shoulder, and said keeper being made of a single piece of sheet material and having in succession an attaching portion, a relatively outwardly extending shoulder, a relatively upwardly inclined guiding portion, a relatively inwardly extending top portion, and a plurality of prongs extending in a relatively downward direction from said top portion.

5. A keeper for a latch, said keeper being made of a single piece of sheet material having in succession an attaching portion, a relatively outward shoulder, a relatively upward portion, a relatively inwardly extending top portion, and a relatively downwardly extending retaining portion.

6. A keeper for a latch, said keeper being made of a single piece of sheet material having in succession an attaching portion, a relatively outward shoulder, a relatively upward inclined guiding portion and a relatively inwardly extending top portion, and two spaced prongs extending relatively downward from the inner edge of the top portion.

7. A two-part fastener, adapted to latch together two members at an angle to each other and comprising a spring latch and a keeper, said spring latch being made of a single piece of resilient sheet material having in succession an attaching portion, a relatively upwardly inclined portion, a relatively downward portion, and a relatively inwardly extending shoulder, and said keeper having a relatively outwardly extending shoulder adapted to be engaged by the inward shoulder of the latch.

8. A two-part fastener, adapted to latch together two members at an angle to each other and comprising a spring latch and a keeper characterized by said spring latch being made of a single piece of resilient sheet material having in succession an attaching portion, a relatively upwardly inclined portion, a relatively downward portion, a relatively inwardly extending shoulder, and a relatively downwardly extending lip, and said keeper being made of a single piece of sheet material and having in succession an attaching portion, a relatively outwardly extending shoulder, a relatively upwardly inclined guiding portion, a relatively inwardly extending top portion, and two spaced prongs extending relatively downwardly from the inner edge of said top portion.

9. A spring latch adapted for attachment to a member and having a shoulder to coact with a keeper on another member, said latch being made of a single piece of resilient sheet material and having in succession an attaching portion, a relatively upwardly inclined portion, a relatively downwardly extending portion, a relatively inwardly extending shoulder and a relatively downwardly extending lip.

10. A spring latch adapted for attachment to the face of a member and extending across a member at right angles to the member first mentioned and there coact with a keeper on the face of such second member, said latch being made of a single piece of resilient sheet material and having in succession an attaching portion provided with an opening, a relatively upwardly inclined portion, a relatively downwardly extending portion, a relatively inwardly extending shoulder, and a downwardly extending lip inclined relatively outwardly from the inner end of the shoulder.

GEORGE A. TINNERMAN.